United States Patent [19]

List et al.

[11] Patent Number: 4,584,689
[45] Date of Patent: Apr. 22, 1986

[54] APPARATUS FOR MODIFYING THE LIQUEFICATION OR SOLIDIFICATION POINT OF A GAS

[75] Inventors: William F. List, Linthicum; Ronald W. Minarik, Lutherville, both of Md.

[73] Assignee: Westinghouse Electric Corp., Pittsburgh, Pa.

[21] Appl. No.: 130,673

[22] Filed: Mar. 17, 1980

[51] Int. Cl.$^4$ ............................................... H01S 3/22
[52] U.S. Cl. ......................................... 372/55; 372/58; 372/60; 372/34; 372/86; 372/701
[58] Field of Search ................. 331/94.5 G, 94.5 PE, 331/94.5 P, 94.5 T; 204/164, 165; 313/231.3, 231.6; 330/4.3; 250/531; 372/55, 58, 59, 60, 81, 701, 86, 34

[56] References Cited

U.S. PATENT DOCUMENTS

| 3,668,550 | 6/1972 | Bullis et al. | 331/94.5 PE |
| 3,720,885 | 3/1973 | Koloc | 331/94.5 PE |
| 3,826,997 | 7/1974 | Javan et al. | 331/94.5 G |
| 3,887,882 | 6/1975 | Smith | 331/94.5 P |
| 3,891,944 | 6/1975 | Lavarini et al. | 331/94.5 G |
| 3,921,098 | 11/1975 | Hoag | 331/94.5 G |
| 3,934,212 | 1/1976 | Javan et al. | 331/94.5 PE |
| 3,952,266 | 4/1976 | Girard et al. | 331/94.5 G |
| 4,056,789 | 11/1977 | Stregack et al. | 331/94.5 G |
| 4,077,017 | 2/1978 | Gilson et al. | 331/94.5 PE |

Primary Examiner—James W. Davie
Attorney, Agent, or Firm—D. Schron

[57] ABSTRACT

An electric discharge gas laser utilizing a seedant material which is cooled prior to the main laser discharge. The seedant is ionized prior to the cooling process and prior to the main discharge, this pre-ionization maintaining the seedant material in a gaseous state even in view of the lowered temperature for a sufficient time so as to give the required ionization levels.

4 Claims, 8 Drawing Figures

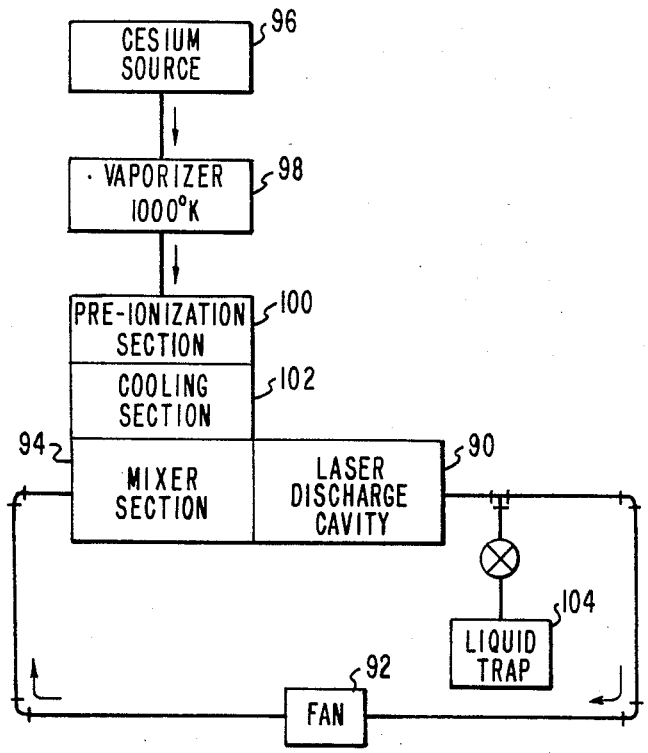
FIG. 7
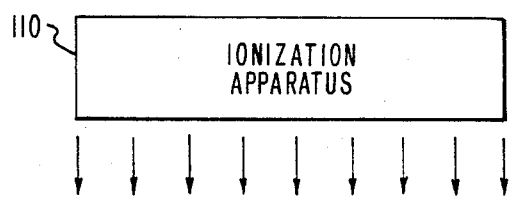
FIG. 8
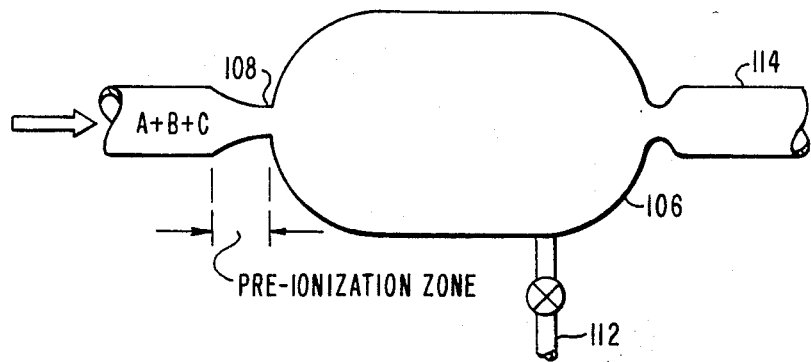

4,584,689

APPARATUS FOR MODIFYING THE LIQUEFICATION OR SOLIDIFICATION POINT OF A GAS

BACKGROUND OF THE INVENTION

1. Field of the Invention

The invention in general relates to processes wherein a gas is to be utilized in environments, the temperature of which may be below the liquefication point of the gas.

2. Description of the Prior Art

There are a variety of controlled chemical processes involving a plurality of gases and wherein one of the gases may revert to an undesired state due to the temperature in the reaction zone of the gases. For example, in the field of electric discharge gas lasers it is known that employing trace amounts of a low ionization seedant gas in the discharge cavity will provide a source of electrons that are beneficial in initiating and stabilizing the discharge, particularly at high power ratings.

In one type of gas laser such as a carbon dioxide laser operated at 300° K. (approximately 80° F.) a low ionization seedant such as tripropylamine is utilized. The seedant is generally ionized prior to the main discharge, with this preionization being accomplished by any one of a number of well-known ionization means such as chemical, electrical, photoionization, such as accomplished by an ultraviolet (UV) spark array, or even by another laser operating at a particular wavelength that produces efficient ionization.

A problem arises, however, in the use of such seedant in lower temperature gas lasers such as carbon monoxide lasers where the operating temperature in the discharge cavity is around 77° K. (approximately −321° F.) at pressures on the order of 0.1–1.0 atm. A good low ionization seedant such as tripropylamine freezes out at temperatures below 150° K. (approximately −190° F.) so that when it is injected into the relatively cold reaction zone of the discharge cavity the seedant will tend to freeze out and may not provide the necessary ions for proper operation.

The present invention allows for the use of such low ionization seedant in relatively low temperature laser systems.

SUMMARY OF THE INVENTION

Apparatus according to the present invention for modifying the liquefication or solidification point of a gas includes a reaction zone maintained at a predetermined temperature. A plurality of gases are provided, at least one of which would normally assume a liquid or solid sate when subjected to the temperature of the reaction zone. This one gas which would normally assume a liquid or solid state is ionized just prior to its introduction into the reaction zone such that the molecules of the one gas become ionized and will repel molecules of their own kind to prevent clustering or freezing out while in the ionized state.

BRIEF DESCRIPTION OF THE DRAWINGS

FIG. 7 is a block diagram of another embodiment of the present invention as it applies to a gas laser; and FIG. 8 illustrates a system in accordance with the present invention for the selective liquefication of gases.

DESCRIPTION OF THE PREFERRED EMBODIMENTS

Although the present invention is applicable to a variety of chemical processes it will be described initially with respect to electric discharge gas laser apparatus.

Figure 1:
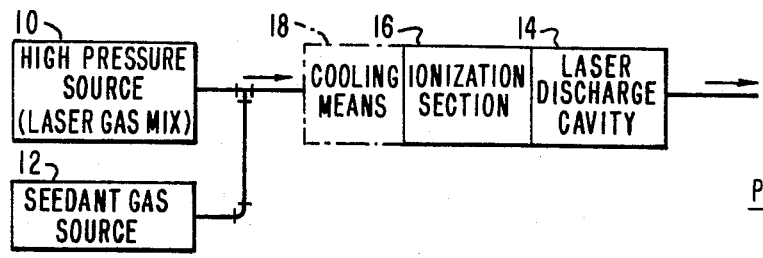
FIG. 1 is a block diagram of a prior art gas laser system.

In a typical prior art open cycle gas discharge laser system as illustrated in FIG. 1, a laser gas mix from a high pressure source 10, along with a seedant gas from source 12, is provided to a laser discharge cavity 14. In order to assist in the initiation and stabilization of the main discharge, the seedant gas is ionized prior to the main discharge in ionization section 16, which in most systems is part of the main discharge cavity 14. The ionization of the seedant gas may be accomplished by means well known to those skilled in the art, and previously mentioned.

If the active laser gas in the gas mixture is carbon monoxide, it is cooled to 77° K., the operating temperature of the discharge cavity. This may be accomplished with the provision of cooling means 18 which in one well-known embodiment may be comprised of a nozzle array through which gas expansion takes place with the resultant flow in the discharge cavity being either super or subsonic. Under these conditions a seedant gas such as tripropylamine would have a tendency to form crystals or liquefy, thus preventing its ionization and reducing if not eliminating, its intended function to provide seed ions prior to the main laser discharge.

Figure 2:
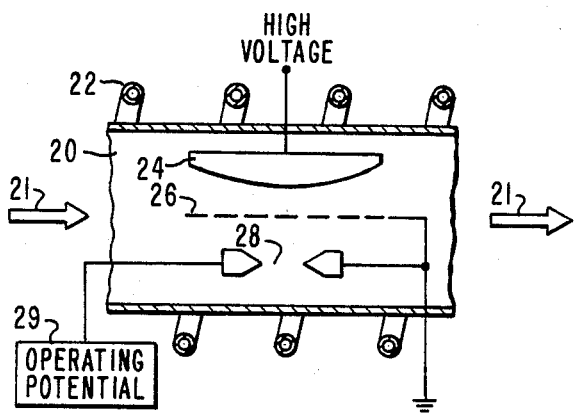
FIG. 2 illustrates a prior art laser cavity having external cooling means.

FIG. 2 illustrates a variation of FIG. 1 and includes a laser discharge cavity 20 through which passes the laser gas and seedant mixture, as indicated by the flow arrows 21. The laser cavity 20 of FIG. 2 is cooled to its operating temperature by means of liquid nitrogen flowing through coils 22 surrounding the cavity.

The laser cavity itself includes a cathode 24 connected to a source of high voltage, a screen anode 26 and a UV source 28 connected to its source of operating potential 29. The UV source 28 may, in one well-known embodiment, take the form of a spark generator. The UV generator is normally used as a pre-ionization source before the main discharge occurs, however, with extremely low operating temperatures the normally gaseous seedant assumes a crystallized or liquefied state so as to be unionizable.

Figure 3:
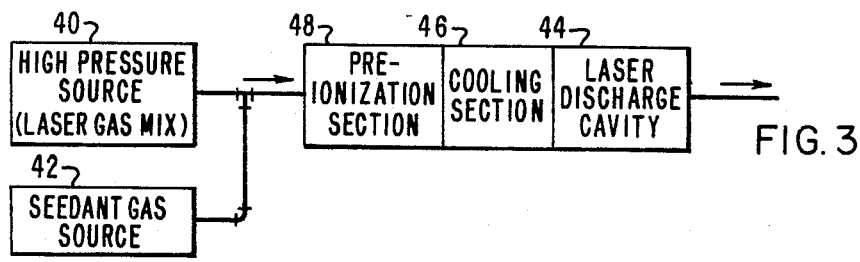
FIG. 3 is a block diagram of a gas laser system in accordance with the present invention.

An open cycle electric discharge gas laser embodiment of the present invention is illustrated in FIG. 3 and includes a source of laser gas mix 40 together with a source of seedant gas 42, both of which are to be provided to laser discharge cavity 44. A cooling section 46, which may be an array of nozzles, is provided just prior to the laser discharge cavity and a pre-ionization section 48 is utilized prior to the cooling section, as opposed to after it, as is done in the prior art systems. The means for accomplishing the pre-ionization may be any one of the aforementioned well-known ionization schemes. Since the seedant molecules are ionized prior to the freezing operation, the tendency to cluster or freeze out while in such ionized state is reduced. It is only necessary to prevent a sufficient number of seedant molecules from freezing out until after the main discharge takes place; that is, 99% or more could freeze out provided the remaining 1% was sufficient to give the required ionization levels.

Figure 4:
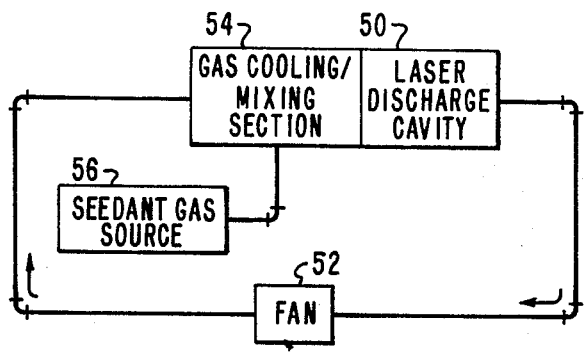
FIG. 4 is a block diagram of a gas laser system in accordance with another embodiment of the present invention.

FIG. 4 illustrates another embodiment of the present invention as applied to a closed cycle electric discharge gas laser system. Laser gas in laser discharge cavity 50 is circulated by means of fan 52 with the circulation loop additionally including a gas cooling/mixing section 54 which is provided with seedant gas from a source 56.

Figure 5:
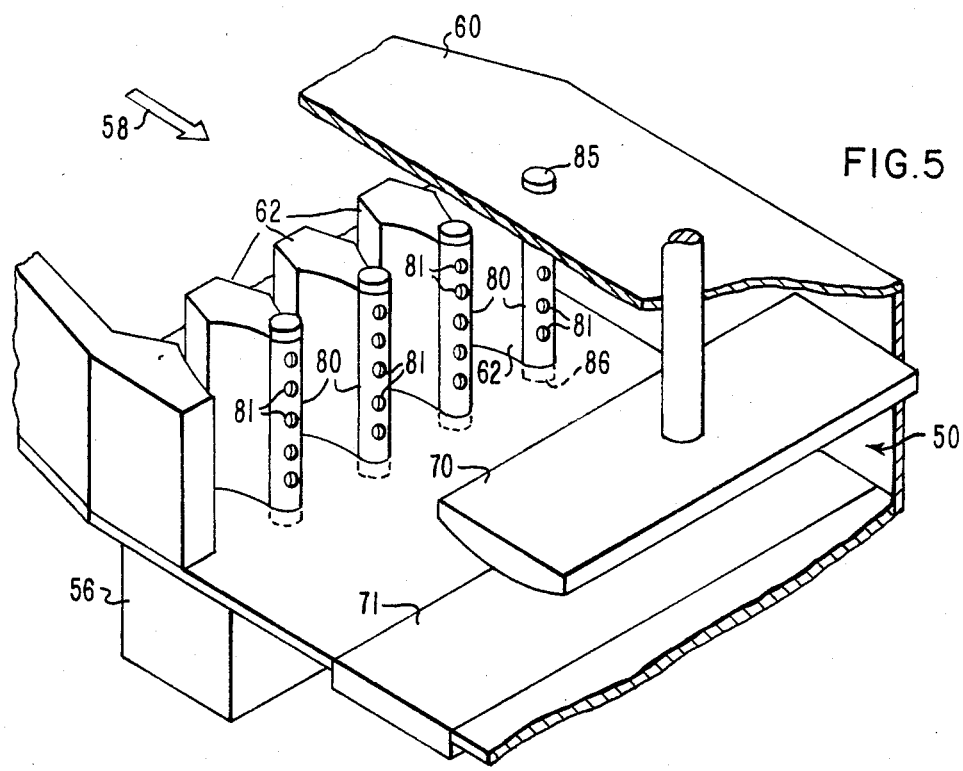
FIG. 5 is a view, with portions broken away, of some components of the system in FIG. 4.

A portion of the apparatus of FIG. 4 is illustrated in somewhat more detail in FIG. 5 wherein circulating laser gas traveling in the direction of arrow 58 in duct 60 becomes cooled by passage through a series of nozzles 62. The cooled laser gases passes into the laser discharge cavity 50 including the space between the cathode 70 and anode 71 electrodes thereof.

The seedant gas from source 56 is provided by a plurality of perforated tubes 80 with the proximity to the nozzles 62 ensuring for adequate mixing of the two gases. The seedant gas, which comprises a small fraction of the total laser gas, is cooled upon mixing with the laser gas.

Figure 6:
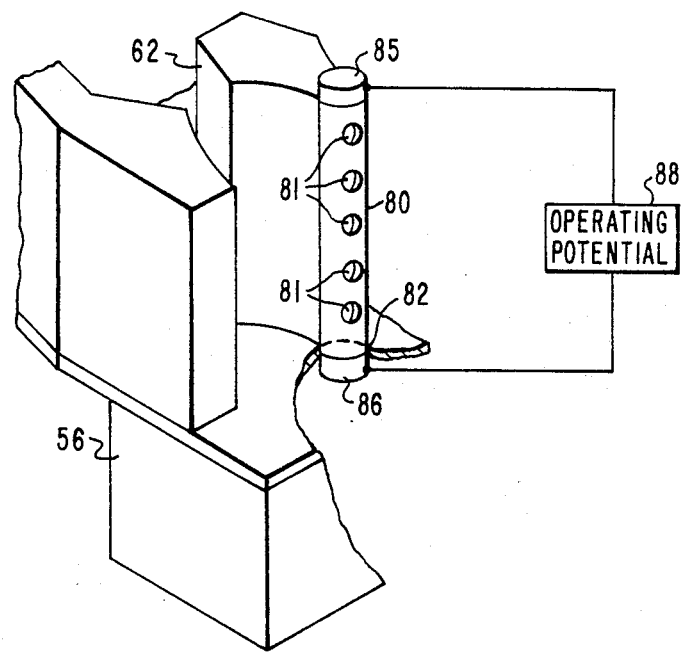
FIG. 6 is a cross-sectional view of a component illustrated in FIG. 5.

As illustrated in FIG. 6, a typical perforated tube 80 for supplying the seedant gas through holes 81 is connected to the seedant gas supply 56 by means of an opening 82. Tube 80 in one embodiment includes endcap ring electrode means 85 and 86 so as to ionize the seedant gas when supplied with proper operating potential from source 88. Tube 80 is constructed of a material of sufficiently low electrical conductivity to ensure that ionization takes place within the tube 80. This ionization process just prior to the cooling process insures for an adequate supply of seedant material for proper laser operation.

The element cesium possesses the lowest ionization energy of any element and is very attractive as a source of free electrons in an electric discharge laser system, such systems operating at the ambient temperature of around 300° K. FIG. 7 illustrates an embodiment of the invention which allows the use of cesium as a seedant material.

Laser gases within laser discharge cavity 90 are recirculated in a closed loop operation by means of fan 92 which provides the gas to a mixing section 94. A cesium source 96 provides cesium in a solid state such as a powder to a vaporizer 98 operable at a temperature of 1000° K. or higher to convert the solid cesium to a vapor form. While in its vapor state, the cesium is supplied to a pre-ionization section 100 where the cesium gas is ionized prior to cooling in a cooling section 102 operable to reduce the temperature of the ionized gas from 1000° K. (or higher) to the ambient operating temperature of 300° K. where it is then mixed with the circulating laser gases in mixer section 94. After the main discharge, liquid cesium may be collected from the circulating loop in a liquid trap 104 in order to recover the cesium for recycling purposes.

FIG. 8 illustrates another embodiment of the present invention outside of the gas laser field. By way of example let it be assumed that a certain gas B out of a mixture of gases A, B and C is to be selectively removed from the mixture by liquefication. Suppose further that at the liquefying temperatures gas component A would normally liquefy first and C last. FIG. 8 illustrates an extraction process for accomplishing the removal of constituent B and includes a cooling zone 106 into which gases A, B and C are introduced through expansion nozzle 108.

Just prior to entering the cooling zone gas constituent A is selectively ionized by means of ionization apparatus 110 which is operable to ionize gas A prior to cooling and which, if desired, may be extended throughout the whole cooling zone so as to maintain gas A in its ionized state whereby it is prevented from freezing out and liquefying. Gas B is not ionized and will liquefy due to the cooling process with the resultant liquefied gas being collected at output 112. The remaining gases A and the non-liquefied gas C exit through conduit 114 where they may be heated to a desired temperature.

We claim:
1. In a gas laser system, the improvement comprising:
   (A) a gas laser discharge cavity zone operable at a predetermined temperature;
   (B) means for introducing a plurality of gases into said zone, at least one of said gases being an active laser gas;
   (C) said plurality of gases including a low ionization seedant gas which would normally assume a liquid or solid state when subjected to the temperature of said zone; and
   (D) means for selectively ionizing said seedant gas to the exclusion of other gases prior to its introduction into said zone.
2. Apparatus according to claim 1 wherein:
   (A) said seedant gas is provided to said zone through a plurality of apertured tubes; and wherein
   (B) said means for ionizing includes electrodes positioned at the ends of said tubes and in communication with said seedant gas.
3. In a gas laser system, the improvement comprising:
   (A) a gas laser discharge cavity zone operable at a predetermined temperature;
   (B) means for introducing a plurality of gases into said zone, at least one of said gases being an active laser gas;
   (C) said plurality of gases including a low ionization seedant gas which would normally assume a liquid or solid state when subjected to the temperature of said zone;
   (D) means for ionizing said seedant gas prior to entering said zone;
   (E) a source of solid seedant material;
   (F) means for heating said material to a temperature higher than that of said zone and of a value to vaporize said material;
   (G) said vaporized material constituting said seedant gas.
4. Apparatus according to claim 3 which includes:
   (A) means for cooling said seedant gas to a temperature comparable to that of said zone prior to introduction into said zone

* * * * *